April 23, 1968  H. A. GIBBON  3,379,065

PRESSURE LIQUID SAMPLING SYSTEM AND APPARATUS

Filed Nov. 14, 1966  5 Sheets-Sheet 1

INVENTOR
HARRY A. GIBBON

Stowell &
Stowell

ATTORNEY

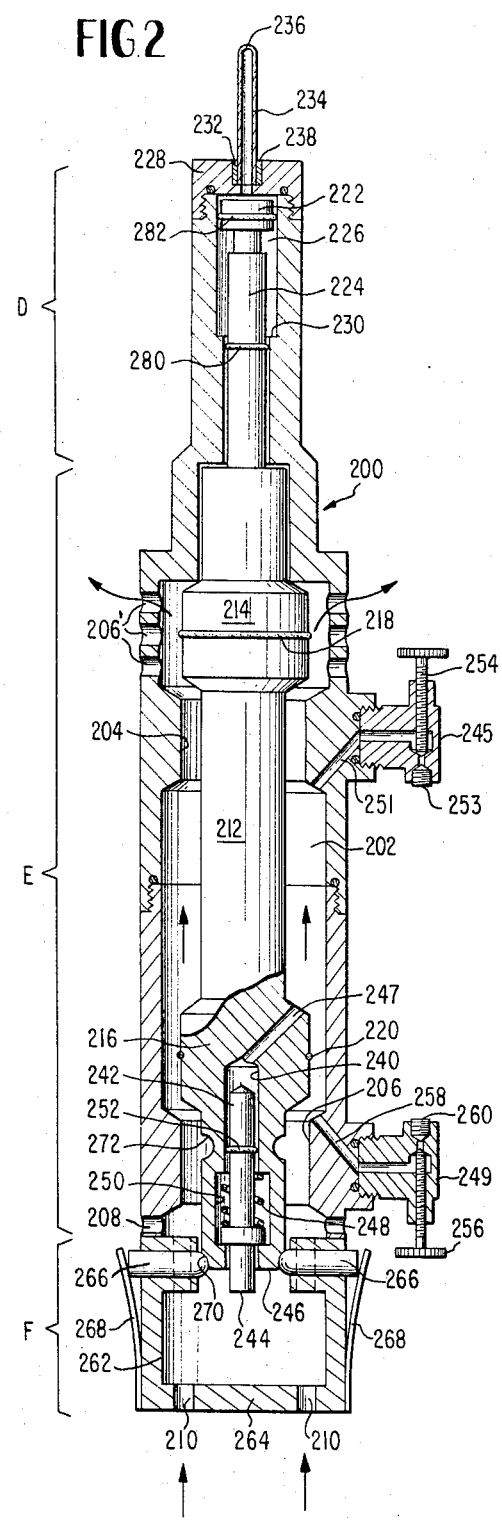
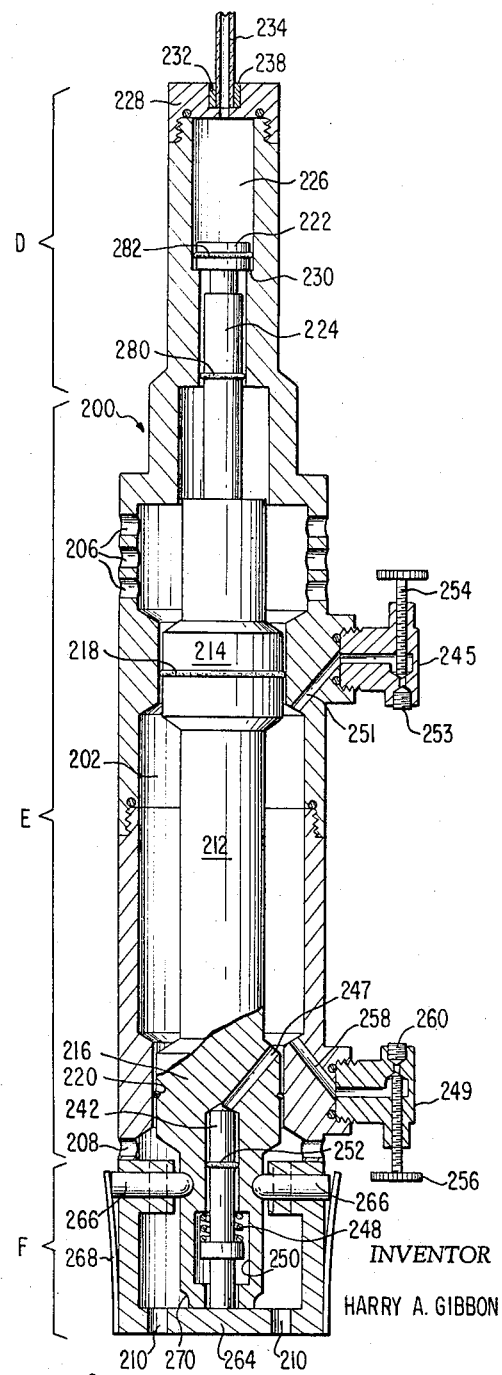

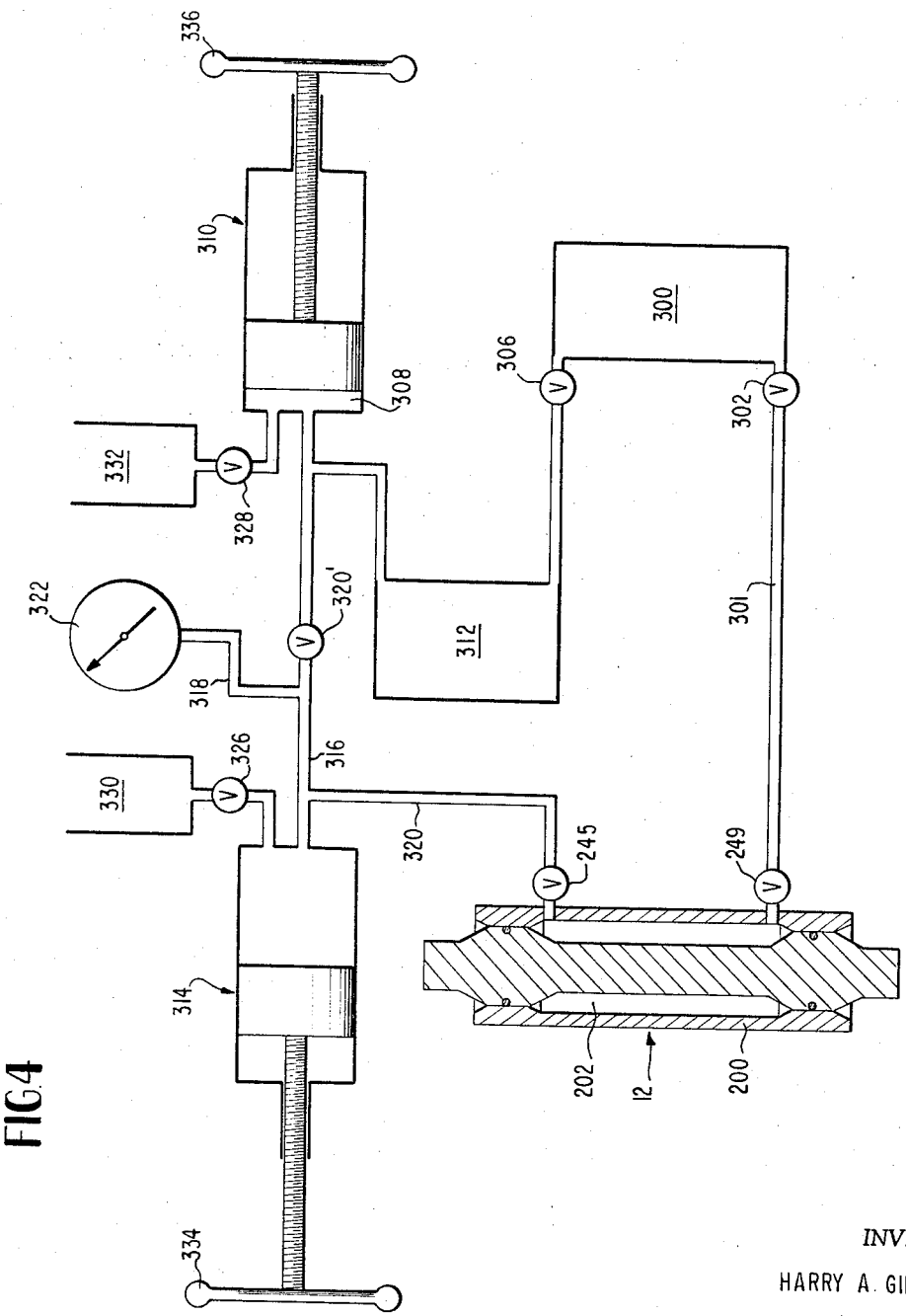

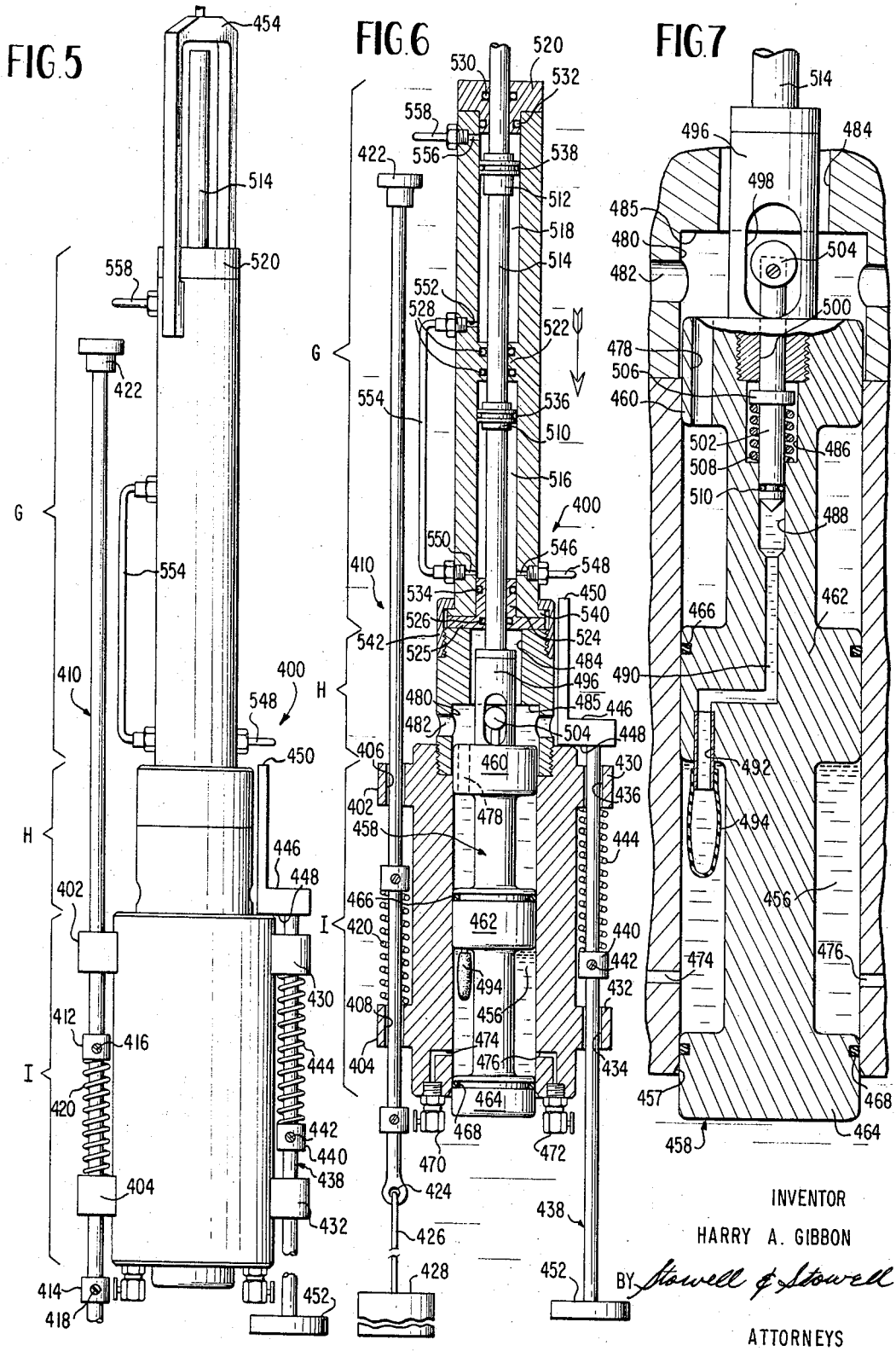

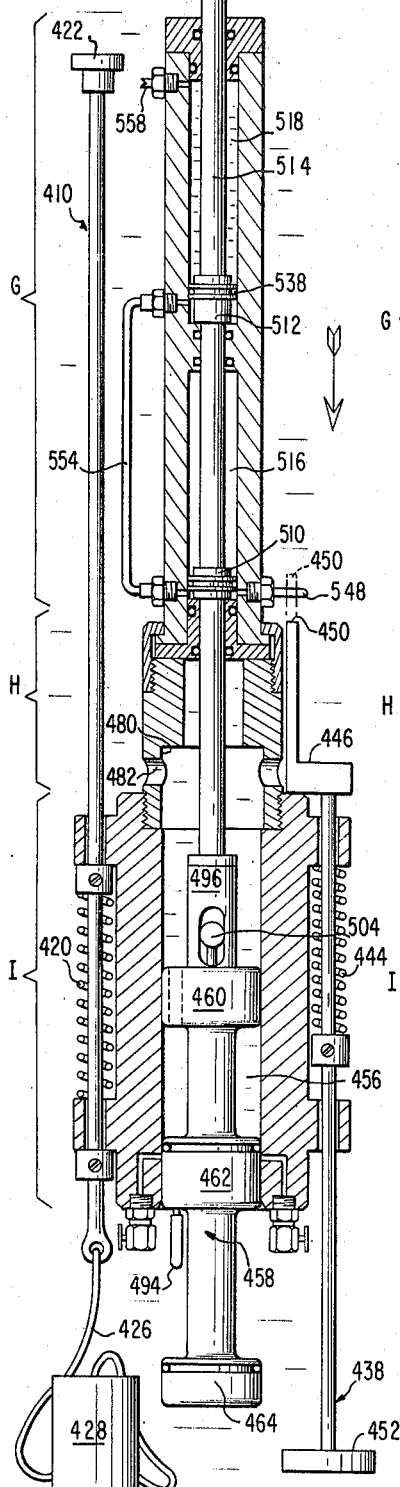
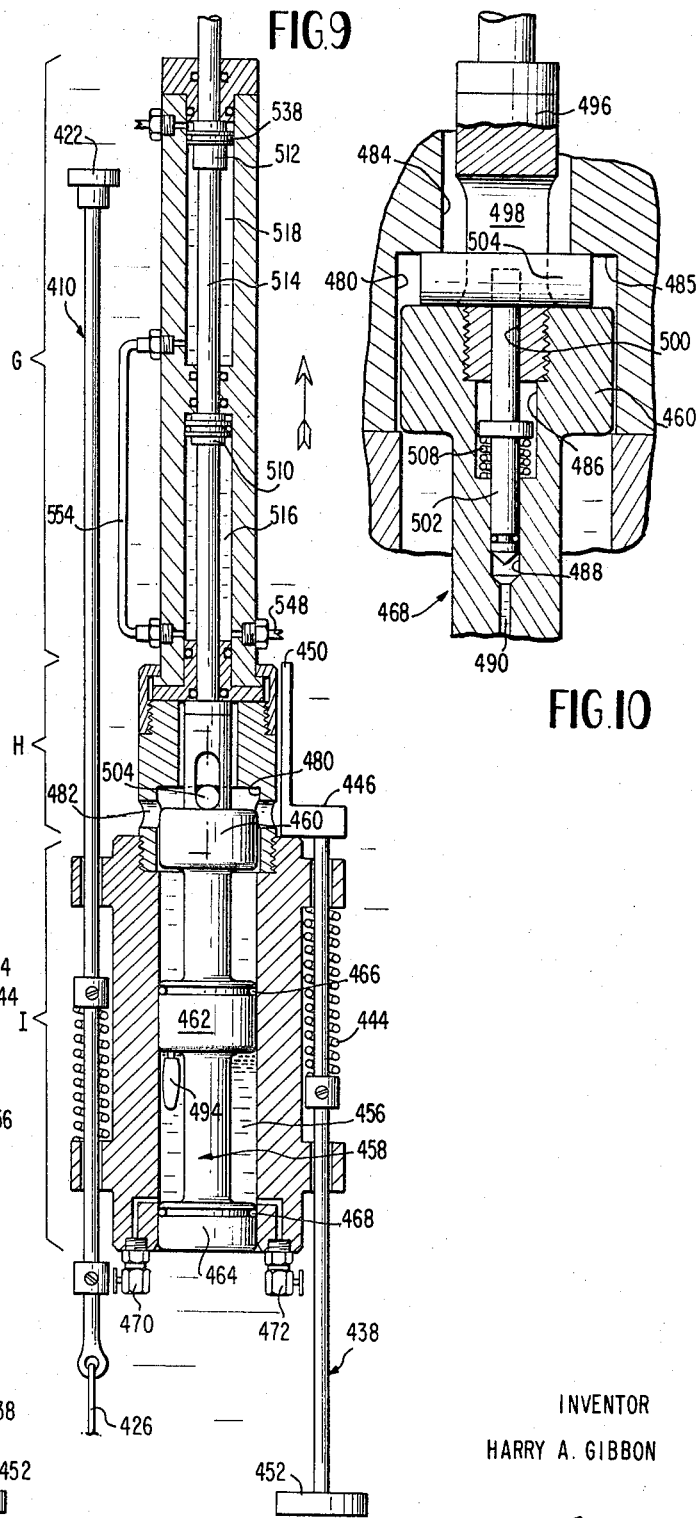

United States Patent Office 3,379,065
Patented Apr. 23, 1968

3,379,065
PRESSURE LIQUID SAMPLING SYSTEM
AND APPARATUS
Harry A. Gibbon, Tarrytown, N.Y., assignor to Research Corporation, New York, N.Y., a nonprofit corporation of New York
Continuation-in-part of application Ser. No. 496,503, Oct. 15, 1965. This application Nov. 14, 1966, Ser. No. 604,097
11 Claims. (Cl. 73—425.4)

ABSTRACT OF THE DISCLOSURE

A device is provided for collecting a fluid sample from a body of fluid surrounding a selectively sealable container and withdrawing the container with the collected sample without contaminating the collected sample by fluid in an environment remote from the collection zone. Provision is also made for removing the collected sample while maintaining the sample at substantially the same pressure at which the sample existed in the collection zone.

This invention relates to an improved pressure fluid sampling system and an improved pressure fluid sampler. This application is a continuation-in-part of applicant's co-pending application Ser. No. 496,503, filed Oct. 15, 1965, now abandoned.

It is a principal object of the present invention to provide a system and apparatus that can receive a fluid sample at a predetermined location within a body of the fluid without the sample being contaminated by other fluids within said body. The invention has particular utility as an oceanographic water sampling device. However, it is contemplated that the improved apparatus may also be used for sampling fluids in deep wells and the like.

One of the heretofore unaccomplished objectives in the field of marine biology was the investigation of the biological characteristics of deep sea marine organisms that have not been subjected to violent changes in environment as compared to the environment normally obtaining in their natural habitat.

It is therefore another object of the present invention to provide a sample collecting system and sampler whereby specimens of marine organism may be obtained from great depths of the ocean and be brought in the same sea water in which they are captured to the laboratories for observation and study without subjecting the specimens to decompression from pressures up to about 16,000 p.s.i.

It is a further object to provide a system and apparatus wherein deep ocean samples may be observed in the laboratory without violent changes of temperature and pressure environment which could have pronounced effects on the marine organisms to be studied.

It is a further object to provide such a system and apparatus including means for controlling the temperature and the pressure conditions within the sampler during the time it is lifted from the point where the sample was taken to the surface of the ocean.

A further object is to provide a system and means for transferring samples of sea water, with any material contained in solution or suspension therein, from the sampler under controlled pressure and temperature conditions to an appropriate container or containers where the physical, chemical and biological characteristics of the collected samples can be investigated.

A further object is to provide such a transfer system whereby materials may be added to the samples without reducing the pressure conditions on the sample being studied.

These and other objects and advantages of the present invention are provided by a pressure liquid sampling apparatus comprising a sample receiving chamber, an opening or openings in the chamber, valve means for opening and closing the opening or openings, means for actuating said valve means, and means for increasing the pressure in said chamber when said valve means are closed; and in one aspect thereof the invention also contemplates a carrier for said sampling apparatus and means on the carrier for actuating the valve means; and in said one aspect the invention further contemplates a housing for enclosing said chamber having an opening or openings communicating with said chamber; the invention further contemplates means for enclosing a sterilized fluid in said chamber and means for ejecting or exhausting said liquid prior to recovery of a fluid sample; the invention further contemplates a system for recovering samples of fluids under pressure and storing said recovered samples under conditions of pressure and temperature equivalent to those existing at the locus of the collected samples.

Other objects and advantages of the invention will be apparent to those skilled in the art from the following detailed description of the invention considered together with the accompanying drawings wherein:

FIG. 2 is an enlarged vertical sectional view through the sampler shown in FIG. 1 with the sampler chamber opened for the flow of fluid therethrough;

FIG. 3 is a vertical sectional view similar to that illustrated in FIG. 2 with the sampler chamber in the closed and sealed position; and FIG. 4 is a schematic view of the improved sample transfer system of the invention;

FIG. 5 is a vertical view of the modified sampler;

FIG. 6 is a vertical sectional view through the device shown in FIG. 5;

FIG. 7 is an enlarged fragmentary sectional view through the pressurizing means for the sample receiving chamber;

Figure 1:
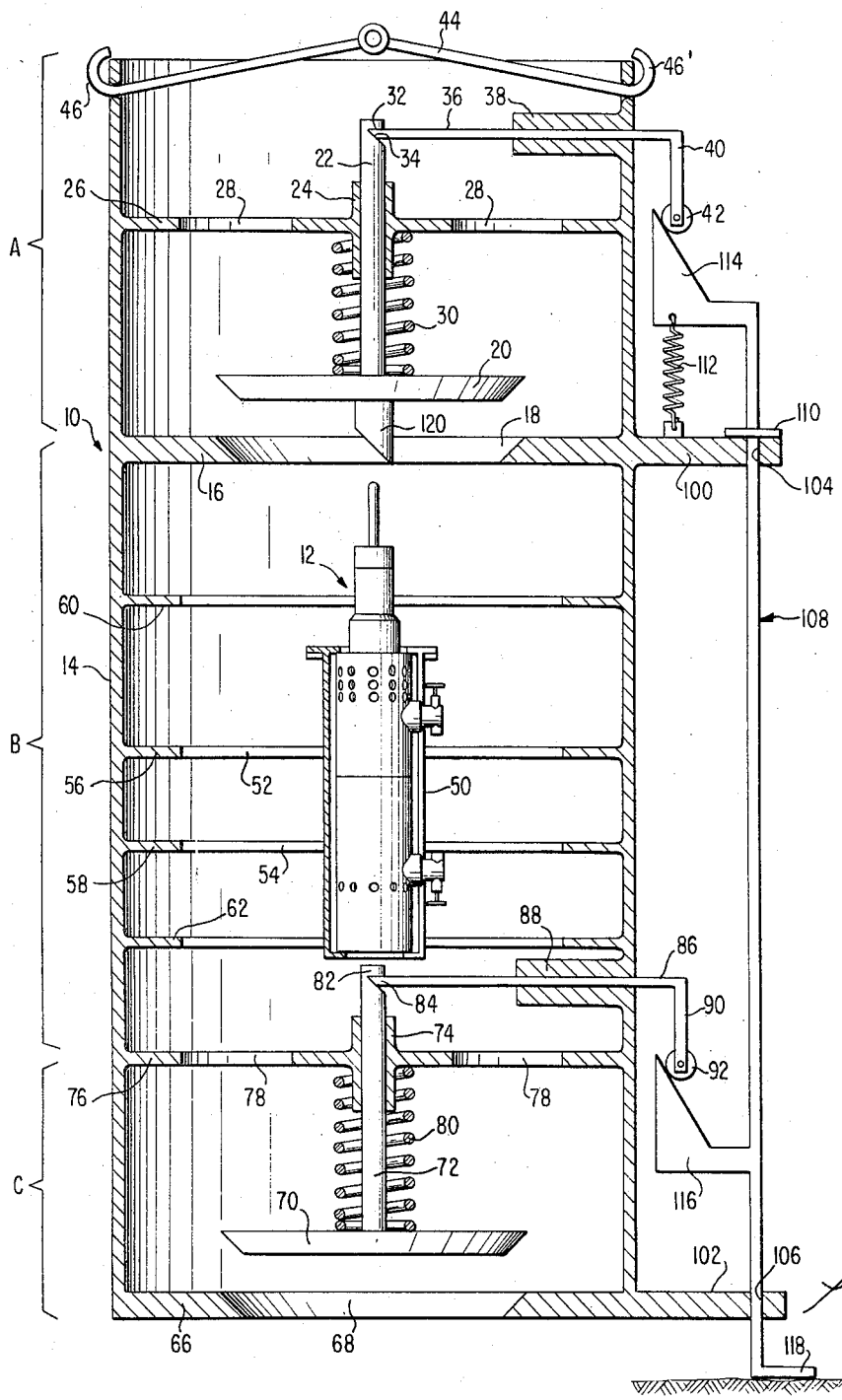
FIG. 1 is a vertical view in partial section of the improved sample and sampler carrier of the invention.

FIGS. 8 and 9 illustrate the open and sealed positions of the structures shown in FIGS. 5 and 6; and FIG. 10 is an enlarged fragmentary view of a pressurizing "pump" for the device with the structures rotated 90° from that illustrated in, for example, FIG. 9.

Throughout the specification and claims the terms "liquid" and "fluid" are intended to include true liquids, liquids containing various matter and organisms in solution and/or suspension, mud, ooze and combinations thereof.

Referring to the drawings and in particular to FIGS. 1-3 thereof, 10 generally designates a form of the sampler carrier constructed in accordance with the teachings of the present invention, and 12 generally designates a form of a pressure liquid sampling apparatus.

Now referring particularly to FIG. 1 of the drawing, the sampler apparatus carrier 10 includes a cylindrical housing 14 which is divided into three chambers designated A, B and C in the drawing. Chamber A comprises an upper valve compartment, chamber B comprises a compartment adapted to receive and support the sampler apparatus, and chamber C comprises a lower valve compartment.

Compartment A is separated from compartment B by a transverse plate 16. The transverse plate 16 is provided with an opening 18 therethrough which opening is selectively closable by valve member 20. Valve member 20 is secured to a reciprocating shaft 22 supported in a bearing member 24 carried by a further transverse plate 26. The transverse plate 26 is provided with a plurality of openings 28 therethrough whereby fluid may flow from the zone surrounding the sample carrier into the interior of the chamber A.

A helical spring 30, having one end seated about the bearing member 24 in transverse plate 26 and the other end against the upper surface of valve member 20, normally biases the valve member into sealing engagement with the opening 18 in transverse plate 16.

The uppermost end of valve stem 22 is provided with a recess 32 which recess is adapted to receive the end of 34 of retainer pin 36. The retainer pin or latch bar 36 is mounted for transverse reciprocation in bearing means 38. The other end 40 of retainer pin 36 projects downwardly parallel to the outer wall of cylinder 14 and is provided with a cam follower wheel 42, the function of which will be more fully described hereinafter.

Adjacent the upper end of cylinder 14, within chamber A, is provided means 44 for attaching a cable, line, chain or the like to the carrier for lowering and raising the carrier to and from the desired depth. In the illustrated form of the invention the hitch member 44 has end elements 46 and 46' which pass through holes in the side walls 14 of the carrier 10.

Within compartment B is mounted the sampler apparatus 12 in a framework 50 carried by spiders 52 and 54 which include annular baffle members 56 and 58. Other annular baffles 60 and 62 may be mounted within the chamber B to minimize heat transfer by convection within the sampler carrier during transfer of the carrier from the locus where the sample was taken to the surface of the ocean. It is also contemplated that, where desired, heat conduction may be further reduced by filling the annular space defined by chamber B with a liquid or fluid pervious low heat conductive material which will further reduce convective transfer of heat. The porous material should be of such a nature that it will not severely limit flow of fluid during lowering of the sampler carrier to the level where the sample is to be obtained. The requirements for a suitable filler material may be suitably met by long fiber, fiber glass; disintegrated cellular polyethylene; polyethylene or glass spheres, and the like.

The lower valve compartment C is provided wtih a bottom transverse wall 66 having an opening 68 therethrough. The opening 68 is closable by a valve member 70 having a valve stem 72. The valve stem 72 is reciprocally mounted by bearing means 74 centrally carried in transverse plate 76 which is provided with a plurality of apertures 78 therethrough.

The valve means 70 and its stem 72 are normally urged downwardly, that is, into the closed position by helical spring 80, the upper end of which bears against the transverse partition 76 and the lower end of which bears against the upper surface of the valve means 70. The extended end 82 of the valve stem 72 is provided with a recess which is adapted to receive end 84 of reciprocating latch bar means 86 similar in form and construction to the latch bar or retainer pin 36 described with reference to chamber A. The latch bar 86 is mounted in bearing means 88 carried by the cylindrical side wall 14 of the casing. Downwardly depending end 90 of the latch bar rotatably supports a cam follower wheel 92 the function of which is to be more fully described hereinafter.

As hereinbefore pointed out, one of the objects of the sampler carrier 10 is to control the temperature of the water immediately surrounding the sampler apparatus 12 within the sampler carrier during the upward trip of the sampler carrier from the colder to the warmer zones of the ocean. Any increase in temperature of the water within the sampler carrier during the upward trip can result, primarily, only from heat exchange by conduction through the outer walls of the carrier from the warmer water of the upper ocean to the colder water in the annular space of chamber B. Once heat exchange between the fluids starts it is further aggravated by convection currents within the annular space defined by chamber B and, as hereinbefore discussed these convection currents are reduced by the baffle means 56, 58 and 62 and/or by the inclusion, within the chamber B, of fluid flow restricting means such as fiber glass.

Further measures can be taken to control this heat flow such as constructing the cylindrical wall 14 of the sampler carrier with a low heat conductivity material such as resin bonded fiberglass and/or sheet polyethylene or relatively nonporous polyethylene foam material. Each of the transverse baffles or wall means may also be constructed of such low heat transfer material to further minimize heat transfer from the chamber B.

Each transverse plate member 16 and 66 has a laterally extending boss 100 and 102; each of which is provided with a bore 104 and 106 and through which is slidably received an actuating member generally designated 108. The actuating member is normally biased, by spring 112, such that stop member 110 is in contacting relationship to the upper surface of the laterally extending boss 100. The actuating member 108 is provided with a pair of cam surface elements 14 and 116 which are engaged by cam follower wheels 42 and 92 respectively. The lower end 118 of the actuating member 108 projects transversely of the longitudinal axis of the actuating member and provides an extended surface adapted to contact the floor or bottom of the ocean and when contacted the actuating rod 108 is urged upwardly whereby the cam surface members 114 and 116 in cooperation with the cam rollers 42 and 92 urge actuating rods or latch bars 36 and 86 laterally outwardly to release valve stems 22 and 72. As to be more fully discussed hereinafter the lower surface of valve plate 20, in chamber A, is provided with a depending member 120 which initiates closure of valve means within the sampler apparatus per se.

Referring now particularly to FIGS. 2 and 3, the sample apparatus per se generally designated 12 includes a rigid cylindrical casing 200. In view of the substantial pressures which are often maintained within the sampler apparatus and the corrosive nature of sea water, the casing is preferably constructed of a material that is relatively non-corrosive in sea water such as 316 stainless steel.

The sampler cylinder 200 generally comprises three main sections designated D, E and F. The main portion of the sampler cylinder that is, section E, comprises a sample receiving and storing chamber 202 which is bound by lands 204 and 206 at the upper and lower ends thereof. Above the upper land 204 are a plurality of ports 206' and below the lower land 206 are cooperating ports 208 which together with inlet ports 210 in the bottom of the lower section F provide for the flow of fluid through the sampler storage chamber 202 in the direction of the directional arrows during lowering of the sampler apparatus.

Slidably mounted within the sampler cylinder 200 is a piston generally designated 212. The piston 212 is provided with a pair of flow control bosses; 214 at the upper end and 216 at the lower end. The outside diameter of each of the bosses 214 and 216 is only slightly less than the inside diameter of their cooperating lands 204 and 206 and are spaced such that the bosses and lands cooperate to form the sealed sample containing chamber 202 as illustrated in FIG. 3 of the drawings. Further, each boss is fitted with at least one resilient O-ring sealing means designated 218 and 220 for bosses 214 and 216 respectively. The function of said O-ring sealing means 218 and 220 will be described in greater detail hereinafter.

Chamber D of the sampler apparatus 12 includes a small piston 222 attached to a piston rod 224. The piston 222 moves in a chamber 226 formed between the head portion 228 and shoulder 230. The head portion 228 is centrally bored as at 232 which bore receives, for example, as glass tube 234 having a sealed upper end 236. Suitable packing 238, between the bore 232 and the glass tube 234, prevents ingress of pressure fluid into the space between the top of the piston 222 and the lower surface of the cylinder head 228 until a sample is to be obtained.

The lower end of piston 212 has a central bore 240 therein which central bore slidably receives a differential pressure forming piston rod 242. The lower end 244 of the piston 242 normally projects beyond the lower end 246 of the piston 212. Further, piston 242 is normally biased to the position illustrated in FIG. 2 by helical spring 248 maintained in a spring chamber 250 adjacent the lower end of the piston 212. An O-ring 252 provides a pressure seal between the outer surface of the differential pressure creating piston 242 and its bore 240.

The assembly also includes a passage 247 which connects the upper end of piston bore 240 and the chamber 202.

A pair of manual valves 245 and 249 is mounted on the cylinder 200. Valve 245 has a passage 251 therein which provides communication between the external fitting 253 and the interior of the sample-containing chamber 202. An actuator 254 for the valve 245 permits communication between the fitting 253 and the bore 251.

Similarly valve 249 includes a manual actuator 256, internal bore 258, and external fitting 260. By opening the valve communication is provided between the external fitting 260 and the sample-containing chamber 202.

The lower end of the sample cylinder 200 is provided with a fitting 262 which comprises chamber F of the device. The fitting 262 includes a bottom member 264 provided with openings 210 and a plurality of detents 266 which are urged by leaf springs 268 toward the central axis of the cylinder 200. Further, the lower portion of the piston 212 is provided with lower cam surface portion 270 and upper detent receiving groove 272. When the sampler is in the open position the inner ends of the detents 266 are in engagement with the cam surface 270. However, when the sampler chamber is closed as illustrated in FIG. 3, the detents 266 are in engagement with the detent groove 272 thereby assisting in holding the piston in the closed position.

*Operation of sampler apparatus and carrier*

The sampler apparatus 12, FIG. 1, is adjusted to the open position illustrated in FIG. 2 and is held in this position by the pressure of the leaf springs 268 urging the locking detents 266 against the cam surface 270, located at the lower end of the piston 212. The manual valves 245 and 249 are closed and the sampler apparatus is secured within its supporting frame 50 illustrated in FIG. 1 of the drawing.

Next valve means 20 and 70, FIG. 1 of the drawings, are set in the open position as illustrated in FIG. 1 and are held in said open position by the cooperating latching rods 36 and 86 respectively. With these valves in the open position and with the sampler piston in the position illustrated in FIG. 2 during the lowering of the carrier there is a purging action caused by the circulation of the fluid through the open carrier and through the open sampler. This circulation insures that any sample taken by closing the sampler valves is representative of the fluid at the depth level where the sampler valves were closed.

When the sampler carrier with its sample contained therein reaches the depth, trigger mechanism 108 is actuated. In the illustrated form of the invention actuation of the trigger 108 is brought about when the sampler housing approaches the ocean bottom where marine organisms are found in relatively high concentration. The mode of operation of the trigger is such that when the foot or base portion 118 strikes the ocean bottom trigger rod 108 moves upwardly against the tension of spring 112 and this upward movement relative to the outer shell 14 of the carrier urges latching rods 36 and 86 outwardly, releasing their inner ends from the recesses 32 and 82 in valve stems 22 and 72. With the valve stems released valve springs 30 and 80 close valve members 20 and 70 against their respective seats 18 and 68.

It is to be pointed out that where it is desired to close valves 20 and 70 at some depth between the ocean bottom and the surface a "messenger" may be dropped down the cable to actuate a trigger rod to release the latches which hold the valves in their open position.

When the uppermost valve 20 is triggered shut the lower projection 120 is moved down into a position where its end breaks the glass tube 234 thereby permitting surrounding fluid to enter the bore 226 above the piston 222. It is to be pointed out that the bore 226 is maintained at atmospheric pressure prior to breaking of the glass tube 234 by O-ring seal 280 about piston rod 224 and O-ring seal 282 about the piston head 222. The diameter of the piston 222 is sized, in relation to the diameter of the piston rod so that the force exerted by pressure of the sea water above the piston and acting against its head is sufficiently greater than the force exerted by the pressure of the sea water at the lower end of piston 212, that the piston rods 224 and 212 are moved downwardly until the bottom 246 of the piston rod 212 is in contact with the inner surface of bottom plate 264 as illustrated in FIG. 3 of the drawings.

Downward movement of the piston rod 212 forces piston bosses 214 and 216 into a relationship with their cooperating lands 204 and 206 such as illustrated in FIG. 3 of the drawings. The sampler apparatus is now closed and the desired sample of sea water, with any matter it may contain, is retained in the annular space 202.

It will be visualized that when the sampler is closed there is no differential pressure between the contained sample and the fluid surrounding the sampler. Thus, there is no differential pressure between the upper and lower surfaces of O-ring seals 218 and 220. In order for such seals to insure against loss of pressure, as the sampler is pulled upwardly to lower pressure areas, it is necessary to establish a higher pressure within the chamber 202 to deform and to make positive seals between the O-rings 218 and 220 and the walls of lands 204 and 206, respectively. The positive differential pressure, to be established inside the sampler, to deform the said O-rings is produced by the action of differential pressure establishing piston 242. The piston 242 is moved a limited distance within its cylinder bore 240 during the closing of the sampler, that is, by the downward movement of the main piston 212. As will be seen, from FIG. 2, the lower end 244 of the pressure establishing piston 242 will strike the inner surface of stop plate 264 prior to contacting of said plate by the bottom surface of the main piston 212. The same pressure differential which sets the O-rings 218 and 220 on the main piston rod 212 also sets O-rings 252 carried on the piston 242. It should be pointed out that upward movement of the differential pressure establishing piston, within its cylinder, does not start until the main sampler piston 212 has moved a sufficient distance downwardly to bring the O-rings 218 and 220 into contact with the inner cylindrical walls of the lands 204 and 206 respectively, thus closing communication between the annular sample space 202 and the water surrounding the sampler. The size relation between the volume of the annular sample space 202 and the volume of water displaced by the upward movement of the differential pressure establishing piston 242 is chosen so that the pressure exerted on the O-rings is sufficient to deform them and thereby prevent any pressure losses due to leaks. It has been found that pressures, in the order of 16,000 p.s.i. or more can be maintained in the chamber 202.

After the sampler has been closed and sealed at the sampling pressure the pressure within the annular sampler space may be expressed as $P + \Delta P$ where $P$ is the pressure of sea water at the sampling depth and $\Delta P$ is the small additional pressure introduced within the sampler on the upward movement of the differential pressure establishing piston. During the first two or three feet of upward movement of the sampler to the ocean surface it is desired to maintain this $P$ to insure that O-rings 218 and 220 continue to exert their sealing action. This is accomplished in the apparatus of the present invention by the plural spring-urged detents or locking pins 266 which engage the groove 272 in the main piston 212 as illustrated in FIG. 3 of the drawings.

After the sampler carrier, containing the sampling apparatus, has been lifted to the surface of the ocean it is then necessary to transfer the sample, under controlled pressure and temperature, to a suitable chamber where it may be stored, investigated, or manipulated in any desired manner. The present invention accomplishes the simple transfer of the sample by means of the system shown in FIG. 4 of the drawings. Referring to FIG. 4, where elements described with reference to FIGS. 1, 2 and 3 are given identical reference characters, when it is desired to transfer the sample from the sample chamber 202 of the sampler 12 to a further pressure container 300 under controlled pressure and temperature conditions the main sampler cylinder 200 is connected, by means of high pressure lines, to the container 300 as to be more fully described hereinafter. During the transfer the entire system shown in FIG. 4 is maintained at a controlled temperature substantially equal to that at which the sample was originally subjected; however, means for maintaining the temperature are not shown in the drawing.

Prior to effecting any transfer of the sample from the sample chamber 202 to the container 300, the tubing 301, from valve 249 to valve 302, and the container 300 are filled with sea water of substantially the same chemical composition as the sample to be transferred. To the sea water may be added, if desired, suitable nutrients of various kinds that may be needed for feeding any organisms that may be entrained in the sample so that the organisms can grow and multiply in an environment the same as that normally obtaining in their natural habitat. The container 300 may also be provided with observation and lighting ports of transparent material through which the investigator may observe the contents of the sample either with the naked eye or with the aid of microscopic equipment. Container 300 may also have enclosed within it releasable samples of various materials which will permit the investigation of the chemical, physical and biological effects of the sea water sample, under conditions corresponding to the conditions in an ocean where the sample was collected.

The next step is to fill that part of the system from valve 306 to the cylinder 308 of positive screw displacement pump 310 with a mineral oil of high purity, of a specific gravity in the order of about 0.9 and which is non-toxic insofar as sea organisms are concerned. The buffer reservoir 312 has sufficient capacity to hold enough mineral oil to prevent sea water from entering the pump cylinder thereby guarding the pump 310 against any damage from contact with the sea water during the transfer of the sample.

The next step is to fill the pump 314 to its full capacity with mineral oil as well as the tubing 316, 318 and 320 leading to the gauge 322, the valve 320' and the valve 245.

Appropriate bleed valves 326 and 328 are also incorporated within the system to permit bleeding of any air that may be trapped therein. With valves 328, 326, 245 and 249 closed and valves 320' 306 and 302 open the pressure within the system as indicated by gauge 322 is brought up to a level substantially equal to the pressure at the ocean at the depth at which the sample was collected. This is accomplished by means of the positive displacement screw actuated pump 314. It will be noted that the cylinders of pumps 310 and 314 may be refilled with mineral oil from reservoirs 332 and 330, when desired. When this condition has been reached the sampler valves 245 and 249 may be opened with no resultant change in pressure within the annular sampler space 202.

The actual transfer of the sample is effected after valve 320' is closed by turning pump screw 334 in the direction to force mineral oil into the system and by simultaneously turning pump screw 336 at the same rate and in an appropriate direction to admit fluid into the pump chamber 308. The movement of each of the two pump systems at the same rate will effect transfer of the fluid without changes in the pressure of the system. Where desired the two pumps may be mechanically interconnected such that positive uniform movement may be insured. While there is no change in pressure in the system there is movement of fluid from the sampler 12 into the container 300 and the amount of the sample transferred by the movement of the piston of pump 314 is equal to the amount of fluid displaced by movement by its piston. If one full stroke of the two pistons is not sufficient to transfer the desired quantity of the sample, the valves 245 and 249 are closed and the valves 320', 326 and 328 are opened and additional mineral oil is drawn into pump cylinder 314, from reservoir 330, and excess fluid is expelled from pump cylinder 310 and forced into reservoir 332. The system is again brought up to the desired pressure as described above, after which it is possible to resume the transfer of the desired amount of the sample.

It is important, in a transfer system, which has to move a liquid that may contain living organisms, to employ a transfer medium that is not readily miscible with the medium to be transferred, that has no toxic effect on live organisms and that has a specific gravity different from and preferably less than that of the sample. Mineral oil of high purity with a specific gravity of about 0.9 meets these conditions when employed with sea water samples, but the operation of the system is not limited to use of such a transfer medium. The specific gravity difference between the transfer medium and sea water is important in order that a definite interface between the medium and the sea water will be established. It has been found that certain inert gases such as helium may also be suitably employed as a transfer medium.

While the aforedescribed embodiment of this invention provides a relatively efficient system for retrieving samples of fluid, there are some problems inherent in that system, particularly when absolute purity of the sample is required. Since the sampling chamber of the embodiment of FIGURES 1 through 3 is purged with ambient fluid throughout the descent of the apparatus, there is a probability that bacteria, and other organisms from the purging fluid will contaminate portions of the sampling chamber, particularly in the area of the bore 240, the passages 247 and 251 and the bore 258. Since these components cannot be effectively exhausted, liquid from these spaces could thereby contain organisms from depths above the desired sample depth.

It has been found that absolute purity of the sample can be insured by providing a modified structure in which the sampling chamber is initially sterilized and sealed prior to launching the sampler and wherein means are provided to momentarily open the receiving chamber for sample taking at the proper time. An example of such a device is shown in FIGURES 5 through 10.

Referring now specifically to FIGURES 5 and 6, the sample apparatus per se includes a rigid cylindrical casing 400 constructed of a material having properties similar to those described for the casing in the embodiment of FIGURES 1 through 3.

The casing 400 generally comprises three main sections designated G, H and I. The casing 400 has, mounted on one side thereof, laterally extending bosses 402 and 404; each of which is provided with a bore 406 and 408 through which is slidably received a first actuating member generally designated at 410. Stops, 412 and 414, are mounted on the actuating member 410, the stop 412 disposed between the bosses 402 and 404 and the stop 414, below the boss 404. The stops are fixed longitudinally of the actuating member 410 by suitable means such, for example, as by set screws 416 and 418. A helical compression spring 420, disposed around the actuating member 410 between the boss 404 and the stop 412, biases the actuating member in an upward direction. A crown 422 is fixed to the upper end of the actuating member 410 for purposes to be described hereinafter. With particular reference to FIGURE 6, it will be seen that the lower end of the actuating member 410 is formed with an eye 424 through which a flexible cable 426 is connected. A weight 428 is attached to the lower end of the cable 426 so that, with the weight 428 suspended, the actuating member assumes the position shown in FIGURES 5 and 6 against the bias of the spring 420. For the purposes of this embodiment, the cable 426 is approximately 30 feet in length and the weight 428 is approximately 35 pounds.

The casing 400 also has, mounted on a side thereof, laterally extending bosses 430 and 432; each of which is provided with a bore 434 and 436 through which is slidably received a second actuating member generally designated 438. Stop 440 is mounted on the actuating member 438 between the bosses 430 and 432 and is fixed longitudinally of the member by means such as, for example, a set screw 442. A helical compression spring 444, disposed between the boss 430 and the stop 440, biases the actuating member 438 in a downward direction. An L-shaped tube breaker 446, having a lower, laterally extending surface 448 and an upper transverse face 450, is fixed to the upper end of the actuating member 438. The lower surface 448 is disposed to engage the upper end of the casing section I to provide a lower stop for the member 438 in the position shown in FIGURES 5 and 6. The lower end of the actuating member 438 is provided with a trigger foot 452 for purposes to be described hereinafter.

The upper end of the casing section G is provided with means 454 for attaching a cable, line, chain or the like to the casing 400 for lowering and raising the apparatus to and from the desired depth.

Referring more specifically to FIGURE 6, the main portion of the sampler cylinder, that is section I, comprises a receiving and storing chamber 456 which is open at the lower end thereof and is enclosed at the upper end by the cylinder section H threadably received therein. The lower opening of the chamber 456 is provided with a beveled surface 457 around the periphery thereof (FIGURE 7).

Slidably mounted within the chamber 456 is a piston generally designated 458. The piston 458 is provided with upper, intermediate and lower cylindrical bosses 460, 462, and 464. The outside diameter of each of the bosses 460, 462 and 464 is only slightly less than the inside diameter of the chamber 456. The bosses 462 and 464 are spaced such that they cooperate to form a sealed sample-containing chamber therebetween in the position shown in FIG. 9. Further, each of the bosses 462 and 464 is fitted with at least one resilient O-ring sealing means designated at 466 and 468 respectively, the function of which will be described in greater detail hereinafter.

A pair of manual valves 470 and 472, similar to the valves 245 and 249 described for the embodiment of FIGS. 1 through 3, is mounted on the lower end of the casing section I. Valve 470 is connected to a passage 474 which provides controlled communication with the interior of the chamber 456. Similarly valve 472 is connected to a passage 476 to likewise provide controlled communication with the interior of the chamber 456. The upper boss 460 is furnished with a longitudinal vent 478 and is spaced from the lower boss 464, a distance substantially equal to the length of the chamber 456 to provide a guide for the piston 458.

The upper end of the chamber 456 is provided with a housing which comprises section H of the device. By reference to FIG. 7, it will be seen that section H comprises a pressure equalization chamber 480 which is in communication with the ambient fluid through vents 482. A reduced cylindrical bore 484, communicating with the chamber 480, is formed in the upper portion of the casing section H. A transverse surface 485 is formed between the chamber 480 and the bore 484.

The upper end of the piston 458 is provided with a central bore 486 which has a lower reduced portion 488 communicating with a passage 490. The passage 490 extends downwardly to the boss 462, turning radially and then again downwardly to the lower face of the boss. A fitting 492 is disposed in the lower end of the passage 490 and sealingly supports a fluid impervious, flexible membrane 494, depending into the chamber 456.

The upper end of the bore 486 is internally threaded and receives a cylindrical upper piston extension 496 therein. The extension 496 extends into the bore 484, in spaced relation to the walls thereof, and is formed with an elongated slot 498 therethrough. A central bore 500, formed in the extension 496 to communicate the slot 498 with the lower surface of the extension, slidably receives a differential pressure forming and pressure equalizing piston rod 502. The upper end of the piston rod has mounted thereon a transverse bar 504 which extends through the slot 498. As can be seen by reference to FIG. 10, the bar 504 is greater in length than the diameter of the bore 484.

The pressure increasing piston rod 502 is provided with a collar 506 intermediate the ends thereof. A compression spring 508 is disposed between the collar 506 and the lower end of the bore 486 in such a manner as to bias the piston rod 502 upwardly so that the collar 506 normally abuts the lower surface of the piston extension 496 when the apparatus is in an atmospheric pressure environment. The rod 504 will normally abut the surface 485 in the above-described environment.

The lower end of the pressure equalizing piston rod 502 is provided with an O-ring 510 to furnish a sliding seal between the piston and the reduced bore portion 488. The reduced bore portion 488, passage 490 and membrane 494 are filled with a fluid at atmospheric pressure so that an isolated hydraulic system, capable of transferring pressure without transferring liquid out of the system, is formed thereby.

Referring again to FIG. 6 of the drawings, the casing section G includes a pair of small pistons 510 and 512 attached to a piston rod 514. The pistons 510 and 512 are slidably received in chambers 516 and 518, respectively, formed between an upper bearing 520, a reduced mid-portion 522 and a lower bearing 524 in that casing section. The lower bearing 524 is formed with a radially extending flange 525 which is disposed between the adjacent transverse faces of the sections G and H. The upper bearing 520, the mid-portion 522 and the lower bearing 524 slidably receive the piston rod 514 and are provided with O-rings 526, 528 and 530, respectively, to provide a sliding seal between the inner peripheries thereof and the piston rod. O-rings 532 and 534 are provided between the outer surfaces of the bearings 520 and 524 and the inner walls of the chambers 516 and 518 to thereby seal the ends of those chambers. The pistons 510 and 512 are also furnished with O-ring seals 536 and 538 around the peripheries thereof to provide a sliding seal contact with the inner surface of the chamber in which they are disposed.

The lower end of section G is formed with a radially entending flange 540. An annular collar 542, threadably received on the upper end of section H, engages the flange 540 to fix section G to section H and compress the flange 525 to fix the bearing 524 in the position shown in FIG. 6. The bearing 520 may be fixed in the upper end of section G in any manner known in the art such, for example, as by force fit, threaded joint, or the like.

The wall of the chamber 516 is transversely bored on the lower end as at 546, which bore receives, for example, a closed transversely extending glass tube 548. The chamber 516 is provided with a second transverse bore 550 of similar disposition, for example, opposite the bore 546. The wall of the chamber 518 is transversely bored on the lower end, as at 552 and is fitted with a pressure transmitting tube 554 which is connected to the bore 550 to provide transmission of pressure between the corresponding ends of the chambers 516 and 518. A second transverse bore 556 is provided in the upper end of the chamber 518 and is fitted with, for example, a closed transversely extending glass tube 558. The above-described structure thereby prevents ingress of pressure fluid into the space between the top of the piston 512 and the lower surface of the bearing 520 and the spaces on either side of the piston 510 until a sample is to be obtained, as will be described hereinafter.

*Operation of the Apparatus of FIGS. 5 through 10*

The sampler apparatus is adjusted with the piston 458 in the position illustrated in FIG. 6. The storing chamber 456 is sterilized and a source of sterile fluid, such as distilled water, or the like, is connected to the manual valves 470 and 472. With the valves open, the chamber 456 is filled with sterile fluid at atmospheric pressure by circulation through the valves. The valves 470 and 472 are then closed and remain so until it is desired to remove the contents of the receiving chamber 456. With the apparatus suspended by the means 454 and ready for lowering, the suspended weight 428 holds the first actuating member 410 in the position shown in FIGS. 5 and 6 against the bias of the spring 420 and the second actuating member 438 is disposed in the position shown under the biasing influence of the spring 438.

As the apparatus is lowered and the depth increases, there is a proportional increase in the pressure of the surrounding fluid. With this pressure increase, an increasing pressure differential is imposed across the O-rings 466 and 468 since the initial pressure of the sterile fluid in the chamber 456 is atmospheric. Unless provision is made to counter this increasing pressure differential across the O-rings, they would deform and bind and thereby either prevent subsequent operation of the piston 458 or incur damage when the piston is operated and thereby fail to properly seal the chamber 456 after operation of the piston. This invention furnishes means to avoid the above-described problem by providing a pressure equalization device which increases the pressure of the sterile fluid in the chamber 456 to correspond to that of the surrounding fluid thereby avoiding the imposition of substantial pressure differential across the O-rings 466 and 468. This is achieved through the isolated hydraulic system in the piston 458 formed by the reduced bore portion 488, the passage 490, the membrane 494 and the pressure equalizing piston rod 502. Since the upper end of the piston rod 502 is in communication with the surrounding fluid through the pressure equalizing chamber 480 and the vents 482, the pressure of the surrounding fluid is imposed on the piston rod to drive it downwardly against the bias of the spring 508 to thereby correspondingly increase the pressure of the fluid in the reduced bore portion 488 and passage 490. This increased pressure is transmitted, without transfer of fluid, to the sterile fluid in the chamber 456 through the flexible membrane 494 so that the pressure in the chamber corresponds to that of the surrounding fluid to reduce the pressure differential across the O-rings 466 and 468. The piston 502 and membrane 494 are shown in a monitoring or pressure equalizing position in FIG. 7. Obviously membranes of other configurations can be substituted for that shown without departing from the teachings of this invention.

When the apparatus approaches the desired depth, the first actuating member 410 is operated. In the form illustrated in FIG. 8, operation of the member 410 is brought about when the load, imposed by the weight 428, is taken up by the ocean bottom thereby allowing the member to move upwardly under the influence of the spring 420. As the member 410 moves upwardly, the crown 422 breaks the glass tube 558 thereby permitting the surrounding fluid to enter the chamber 518 above the piston 512. Since the pressure beneath the piston 512 in the lower part of the chamber 518 is substantially atmospheric, the piston rod 514 and piston 458 are driven downwardly to the position shown in FIG. 8 thereby fully exhausting the chamber 456 and dumping the sterile fluid therein.

It is to be pointed out that, where it is desired to exhaust the chamber 456 at some other depth between the ocean bottom and the surface, a "messenger" may be dropped down the cable to break the glass tube 558. Other means such as tube breaking mechanisms set to operate at a predetermined pressure or a valve set to operate at a pre-determined pressure, may also be used in lieu of the device specifically described.

As the apparatus continues its descent, after exhaust of the chamber 456, the trigger foot 452 strikes the ocean bottom and moves the second actuator 438 upwardly against the bias of the spring 444 so that the face 450 of the tube breaker 446 moves toward the position shown in phantom in FIG. 8 and breaks the glass tube 548 to permit the surrounding fluid to enter the chamber 516 beneath the piston 510. The fluid entering the chamber 516 is also transmitted to the chamber 518 through the tube 554 to balance the pressure on each side of the piston 512. Since the pressure in the chamber 512 above the piston is substantially atmospheric or sub-atmospheric and the pressures acting elsewhere on the system are balanced, the piston 510 and piston rod are driven upwardly to the position shown in FIG. 9 thereby closing the chamber 456 with an entrapped sample of the fluid surrounding the apparatus therein. By equalizing the pressures on the piston 512, pressure differentials across the O-ring 538 are eliminated so that the ring will not deform and bind during movement thereof toward the position of FIG. 9. This pressure equalization also eliminates the necessity of performing the considerable amount of work that would be required to move the piston 512 back to the top of its stroke against the pressure of the surrounding fluid in the chamber 518.

It should be understood that the above-described pressure equalization of the piston 512 may be achieved by means other than as specifically described. For example, a third glass tube may be provided at the lower end of the chamber 518. A tube breaker may be fastened to the upper end of the piston rod 514, disposed so that the third tube is broken when the piston rod reaches the position shown in FIG. 8 to thereby admit fluid surrounding the apparatus into the chamber 518 beneath the piston 512.

As in the aforedescribed embodiments of FIGS. 1 through 3, the O-rings 466 and 468 require pre-loading to initiate proper sealing since no initial pressure differential exists between the surrounding fluid and the sample entrapped in the chamber 456. This is achieved, in a manner similar to that of the first described embodiment, through use of the above described isolated hydraulic system formed in the piston 458. As the piston travels upwardly to the fully closed position of FIG. 9 as best seen in FIGS. 7 and 10, the bar 504 engages the transverse surface 485 thereby preventing further upward movement thereof. Continued upward movement of the piston 468 thereby drives the piston rod 502 downwardly in the reduced bore portion 488 increasing the pressure in the fluid in the passage 490, which increase is transmitted to the sample fluid in the chamber 456 through the membrane 494 without transfer of fluid thereto. The O-rings 466 and 468 are thereby pre-loaded and deformed in such a manner that suitable sealing of the chamber 456 is established.

It should be understood that a carrier, such as that described for the embodiment of FIGS. 1 through 3, may also be provided around the casing 400 to control the heat flow from the sample entrapped in the chamber 456 during the upward trip of the apparatus from the colder to the warmer zones of the ocean.

After the apparatus has been lifted to the surface of the ocean, the valves 470 and 472 are connected to the tubing 301 and 320 of the apparatus shown in FIG. 4 and the entrapped sample is then transferred under controlled pressure and temperature following the aforedescribed steps set forth for the transfer of the sample from the apparatus of FIGS. 1 through 3.

From the foregoing discussion it will be seen that the present invention fully accomplishes the aims and objects hereinbefore set forth. While specific apparatus has been shown and described in the foregoing specification and drawings, it will be appreciated by those skilled in the art that various modifications may be made in the apparatus and in the system without departing from the spirit of the present invention as specifically defined in the following claims.

I claim:

1. A pressure liquid sampling apparatus comprising a housing, a sample receiving chamber in said housing, at least one opening in said chamber communicating with an opening through the housing, valve means for opening and closing said opening in said sample receiving chamber, means for actuating said valve means, and means for increasing the pressure in said chamber.

2. The invention defined in claim 1 wherein said means for actuating said valve means comprises a pressure fluid ram.

3. The invention defined in claim 2 wherein said pressure fluid ram is actuated by pressure of the fluid surrounding said sampling apparatus.

4. The invention defined in claim 1 wherein the means for increasing the pressure in said chamber includes a positive displacement pump the output of which is in communication with said chamber.

5. The invention defined in claim 1 including a pair of manually actuatable valves, and conduit means connecting each of said valves with said chamber.

6. The invention defined in claim 1 including a carrier for said sampling apparatus.

7. The invention defined in claim 1 including a pair of said openings disposed at opposite ends of said chamber communicating with openings through the housing, said valve means closing said openings at opposite ends of said sample receiving chamber when operated by said means for actuating said valve means.

8. The invention defined in claim 7 including a carrier for said sampling apparatus, said carrier comprising a housing, valve means at opposite ends of said housing, means for normally maintaining said valve means at opposite ends of said carrier in an open position, and means associated with one of said valve means for initiating actuation of said valve means at opposite ends of said sample receiving chamber.

9. The invention defined in claim 2 including first means to apply the pressure of the fluid surrounding said apparatus to drive said ram to open said valve means, and second means to apply the pressure of the fluid surrounding said apparatus to drive said ram to close said valve means.

10. The invention defined in claim 9 wherein said valve means comprises a pair of pistons connected to said ram and slidably disposed in spaced relation to one another in said chamber when said valve means is closed, at least one of said pistons extending from said chamber when said valve means is open.

11. A method of obtaining a pure sample of fluid from a fluid body comprising the steps of providing a fluid container, sterilizing said container, filling said container with a sterile fluid, displacing said container to a desired sampling point in the body of fluid, exhausting said sterile fluid from said container, and filling said container with the sample fluid wherein said sterile fluid is further maintained at a pressure corresponding to the pressure of the surrounding fluid during displacement of said container.

References Cited

UNITED STATES PATENTS

| | | | |
|---|---|---|---|
| 2,298,627 | 10/1942 | Proudman et al. | 73—425.4 |
| 2,274,869 | 3/1942 | Pfeiffer | 73—425.4 |
| 2,613,848 | 10/1942 | Wood | 73—425.4 X |
| 3,095,930 | 7/1963 | Kisling | 73—425.4 X |
| 3,266,323 | 8/1966 | Buchanan | 73—425.4 |
| 3,302,464 | 2/1967 | Langguth | 73—425.4 |

FOREIGN PATENTS

| | | |
|---|---|---|
| 352,600 | 1922 | Germany. |

LOUIS R. PRINCE, *Primary Examiner.*

S. CLEMENT SWISHER, *Assistant Examiner.*